United States Patent
Walker et al.

(10) Patent No.: US 10,964,288 B2
(45) Date of Patent: Mar. 30, 2021

(54) AUTOMATICALLY ADAPT USER INTERFACE COLOR SCHEME FOR DIGITAL IMAGES AND VIDEO

(71) Applicant: Western Digital Technologies, Inc., San Jose, CA (US)

(72) Inventors: Thomas Burlington Walker, Sunnyvale, CA (US); Laurent Baumann, Campbell, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/453,362

(22) Filed: Jun. 26, 2019

(65) Prior Publication Data

US 2020/0410955 A1    Dec. 31, 2020

(51) Int. Cl.
*G09G 5/02* (2006.01)
*G09G 5/06* (2006.01)
*G06T 11/00* (2006.01)
*G06T 7/90* (2017.01)

(52) U.S. Cl.
CPC ............ *G09G 5/026* (2013.01); *G06T 11/001* (2013.01); *G09G 5/06* (2013.01); *G06T 2200/24* (2013.01); *G09G 2320/066* (2013.01); *G09G 2320/0666* (2013.01)

(58) Field of Classification Search
CPC combination set(s) only.
See application file for complete search history.

(56) References Cited

U.S. PATENT DOCUMENTS

| | | |
|---|---|---|
| 5,668,572 A | 9/1997 | Meyer et al. |
| 5,898,434 A | 4/1999 | Small et al. |
| 6,459,426 B1 | 10/2002 | Eglit et al. |
| 7,027,172 B1 | 4/2006 | Parulski et al. |
| 7,184,063 B2 | 2/2007 | Shum et al. |
| 8,839,128 B2 | 9/2014 | Krishnaraj et al. |
| 9,558,713 B2 | 1/2017 | Jureidini et al. |
| 10,078,436 B2 | 9/2018 | Wu et al. |
| 2005/0220339 A1 | 10/2005 | Kim |
| 2007/0247475 A1 | 10/2007 | Pettigrew et al. |
| 2009/0204913 A1 | 8/2009 | Kawano et al. |
| 2009/0313585 A1 | 12/2009 | Hellinger et al. |
| 2013/0044123 A1 | 2/2013 | Shah et al. |
| 2013/0057566 A1 | 3/2013 | Kriese et al. |
| 2013/0266217 A1* | 10/2013 | Gershon ............ G06Q 30/0639 382/164 |
| 2013/0300761 A1* | 11/2013 | Ahmed .................... G09G 5/02 345/595 |
| 2014/0044349 A1 | 2/2014 | Wang et al. |

(Continued)

FOREIGN PATENT DOCUMENTS

EP         3258465 A1    12/2017

OTHER PUBLICATIONS

David Tiago Conceicao, Extracting Colors From Images: Integrating Picasso and Palette, May 1, 2016.

*Primary Examiner* — Wesner Sajous
(74) *Attorney, Agent, or Firm* — Patent Law Works LLP (57) ABSTRACT

A method for selecting a dominant color among a set of digital content. The dominant color is used to set the visual aspects of a user interface through which the user views the digital content, enabling a visually appealing application, rather than one reliant on neutral and possibly uncomplimentary colors.

19 Claims, 10 Drawing Sheets

(56) References Cited

U.S. PATENT DOCUMENTS

2014/0052584 A1\* 2/2014 Gershon ............ G06Q 30/0627
705/26.63
2016/0371854 A1\* 12/2016 Gershon ............ G06Q 30/0639
2017/0031583 A1 2/2017 Levieux et al.
2017/0200289 A1\* 7/2017 Gershon ................ G06K 9/628

\* cited by examiner

AUTOMATICALLY ADAPT USER INTERFACE COLOR SCHEME FOR DIGITAL IMAGES AND VIDEO

BACKGROUND

User interface elements for conventional image presentation applications often rely on a palette based on neutral colors for user interface regardless of the color content of media in the user's repository. This leads to a user interface that is, at best, generically bland and difficult to differentiate. At worst, the user interface directly clashes with the user's content or blends in too much. Both of those outcomes result in experience and usability issues.

A typical issue is loss of contrast for user interface elements overlaying (e.g., "floating over") scrollable user-generated content such as image libraries. A lack of contrast between such user interface elements and the displayed content, such as user's content, may result in a displeasing user experience. This lack of contrast can also occur in user interfaces that display over video content displayed in the background.

BRIEF SUMMARY

Apparatuses and methods are presented for generating, by a processor, a display color on a user interface. In one embodiment, a method includes determining, by the data processor, a set of dominant colors for a plurality of digital images from a set of digital content, determining, by the data processor, a display color from the dominant colors, and displaying, by the data processor, the user interface element, having the display color, over digital content. In one embodiment, the user interface element is displayed over the top of the digital content. In certain embodiments, determining the set of dominant colors includes selecting a partition from a plurality of partitions of a color map, the partition satisfying a condition for a number of digital images with dominant colors in the partition. To select the partition, the method may determine the dominant colors for each of the digital images, locate the dominant colors on the color map, segment the color map into the plurality of partitions, and identify the partition from among the plurality of partitions as a partition having the highest number of digital images contributing the dominant colors. In certain embodiments, the method defines the display color as a high contrast color of an average of the dominant colors, the high contrast color comprising a complement of the average of the dominant colors in the partition. In certain embodiments, the method uses the display color as a background color of the user interface element. In certain embodiments, the method uses the display color as a text color for the user interface element. In one embodiment, the digital images used are a subset of a set of digital content, for example video content.

A non-transitory computer-readable storage medium is presented that includes instructions that when executed by a processor of a digital device, cause the digital device to display a plurality of digital images on a display, and generate a foreground user interface user interface element configured for display on a background of one or more of the digital images, the user interface element having a display color selected by: selecting a partition from a plurality of partitions of a color map, the partition selected for having a highest number of the digital images with dominant colors in the partition; and selecting a high contrast color of an average of the dominant colors as the display color.

A computing apparatus is presented that includes a data processing means, a storage means that includes a means for configuring the data processing means to plot dominant colors of a plurality of digital images on a color map, cluster the dominant colors, partition the color map into equal sized regions based at least in part on a position of a largest cluster of the dominant colors, and use a display color derived from the dominant colors of a particular one of the equal sized regions for a user interface element that overlays one or more of the digital images.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments of an algorithm are disclosed to dynamically generate a user interface color scheme by sampling a set of user-generated digital content and define a color (e.g., for overlay user interface elements) that contrasts with the digital content. The color may be utilized in user interface for the user-generated digital content. For example the algorithm may be utilized by a mobile photo management application or may be resident natively in storage hardware, such as a Network-Attached Storage or Direct-Attached Storage device.

The disclosed techniques generate user interface color schemes customized to the user's digital content without deliberate action by the user. The customization may be automatic and may adapt as the user adds or removes digital content from their repository. The user interface color scheme may in some embodiments adapt in real time as a user scrolls across a collection of digital content, in order to best match or compliment the content displayed on screen.

The technique generates a properly contrasted user interface element color for use with a group of digital images. Given a sufficiently large sample size, simply averaging the dominant colors of the digital images may result in an unpleasant brownish color.

In overview, the technique may proceed as follows:

Obtain the dominant color of each digital image or other digital content in a set. (e.g., see FIG. 1.)

Map the obtained dominant colors to a color map. (e.g., see FIG. 2.)

Partition the color map into N partitions. Any integer may be used for N, but exemplary values that may work well for typical sets of digital content are 6<=N<=10. (e.g., see FIG. 3.)

Select the partition having a highest number of the digital images or other digital content contributing dominant colors to the partition. (e.g., see FIG. 4.)

Average the dominant colors within the selected partition to generate the user interface element color. (e.g., see FIG. 7.)

In one embodiment, the color generation algorithm is dynamically applied to only a subset of digital images visible to the user on the display at any given time (i.e., as the user scrolls through a group of digital images, as a video is played). In embodiments, of the solution claimed herein, the user interface element color is adapted automatically as the color composition of the digital content displayed on a display device changes.

Digital content, as used herein, comprises any content that is configured to be displayed visually to a user. In one embodiment, a digital content may comprise a digital photograph, a digital image, a set of digital images, a digital panoramic image, a computer generated image, a user-generated image (e.g., digital artwork, user modified digital photos), a video frame, and the like. In one embodiment, digital content comprises a set of digital images configured for consecutive viewing such as a motion picture, animation, animated Graphics Interchange Format (GIF), video content (user created and professionally created), and the like. Digital content may be organized into a variety of data structures and formats, including data streams, video streams, databases, file folders, files, and the like. Digital content may be also be identified by a variety of file types, including but not limited to, Joint Photographic Experts Group (JPEG), Portable Network Graphics (PNG), Graphics Interchange Format (GIF), Tagged Image File Format (TIFF), Scalable Vector Graphics (SVG), and the like.

Figure 1:
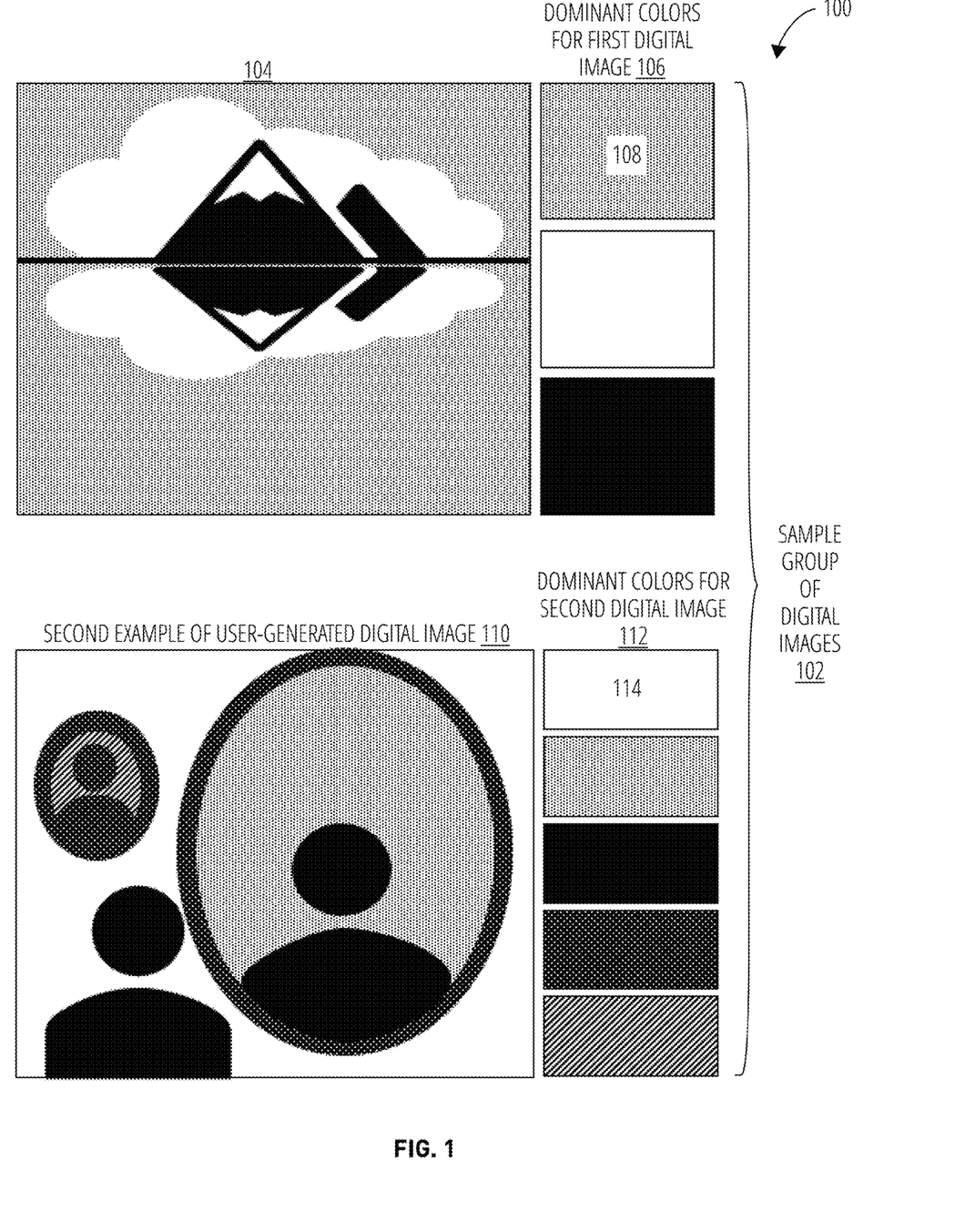
FIG. 1 illustrates dominant color extraction 100 in accordance with one embodiment.

FIG. 1 illustrates dominant color extraction 100 in accordance with once embodiment. A typical set of user-generated digital content may include hundreds of media files, including still images and video. This sample group of digital images 102 is limited to two still images for ease of illustration. The digital image 104 may be analyzed to determine a first dominant color 108. Determining a dominant color may be accomplished through conventional techniques, such as the JavaScript-based ColorThief code and similar programs or macros.

In some embodiments, a plurality of dominant colors 106, such as the three shown here, may be determined. Additional dominant colors may be used to provide a larger color sample size for later steps in the process, in order to improve the selection of user interface (UI) color options. Additional dominant colors may also provide a broader set of choices for direct use in the UI color palette where to provide a more complimentary set of colors.

This step may be repeated for a digital image 110, to determine the second dominant color 114 or multiple dominant colors 112, and so on, for every image in a group of digital images.

A group of digital images may be determined by a static criteria, such as all of the photos in a digital album or all photos taken within a certain time range. The group may also be more dynamically defined, such as all photos visible on a display device. In such a case, the user interface (UI) used to display the photos may alter in appearance as user scrolls through an album to view different photos.

In certain embodiments, the group of digital images may comprise a set of digital frames from digital content comprising a video. For example, in one embodiment, the group of digital images may comprise a set of digital frames, queued to be displayed on a display device in the next predetermined period of time. For example, the group of digital images may comprise a set of digital frames, queued to be displayed on a display device in the next 30 seconds.

Figure 2:
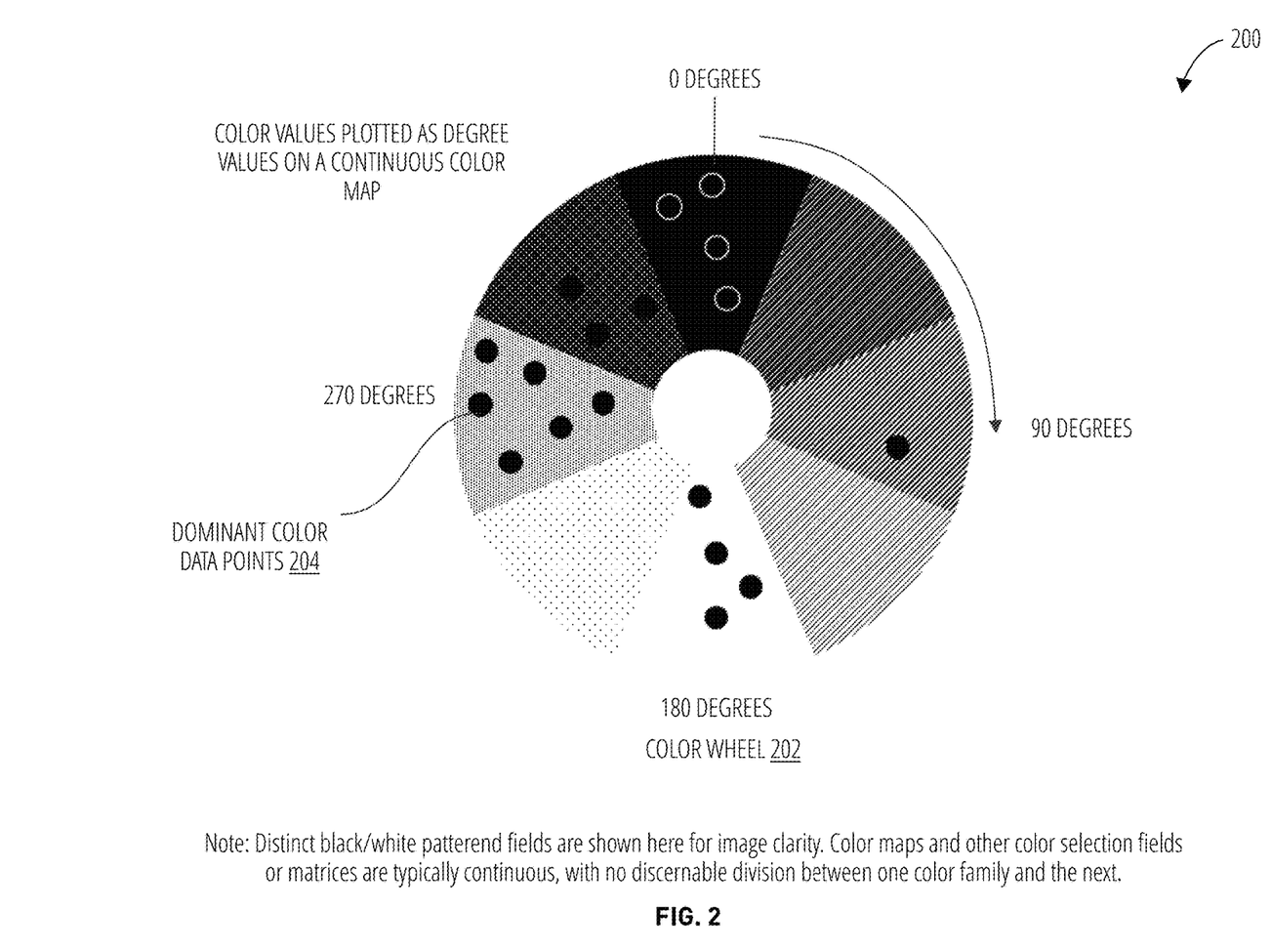
FIG. 2 illustrates dominant color mapping on a color map 200 in accordance with one embodiment.

FIG. 2 illustrates dominant color mapping on a color map 200 in accordance with one embodiment. Color values for the pixels of an image may be defined using a Red Green Blue (RGB) color model, a Cyan Magenta Yellow Black (CMYK) color model, a Hue Saturation Luminance (HSL) model, or other color scheme in which each pixel may be assigned a specific color value. In one embodiment, using an HSL model, a color map (e.g., a color wheel as illustrated) may be established, where each hue value is defined as residing at a particular degree around the circumference of the wheel, from 0 to 360. The color value may also be defined as residing along a specific radial distance from the center of the wheel, indicating the saturation and luminance. Of course, a color wheel is only one example of the color maps that may be utilized.

In FIG. 2, the 0 degree point is at the top of a color map 202. As the circumference of the wheel is traversed, the hue shifts across a spectrum. Note that in this example, distinct fields of black/white patterns have been used to indicate color families, but a conventional color map, field, or matrix is typically continuous, with no discernable division between one family and the next. Based on their hue, saturation, and luminance, the dominant colors discovered as shown in FIG. 1 may be plotted as dominant color points 204 on the color map 202.

Figure 3:
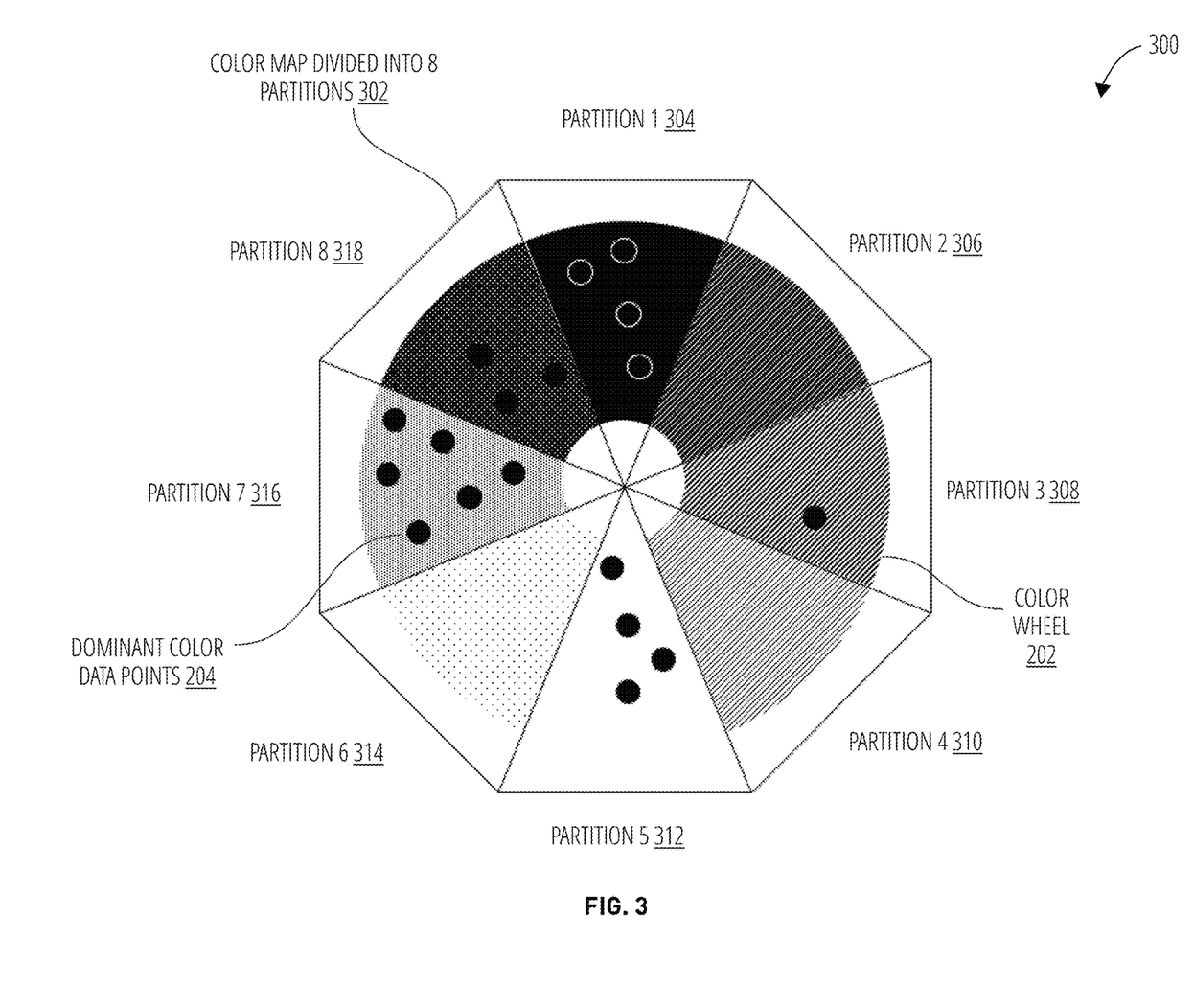
FIG. 3 illustrates color map partitioning 300 in accordance with one embodiment.

FIG. 3 illustrates color map partitioning 300 in accordance with one embodiment. Some number of segments, also called partitions, may be identified as providing a representative grouping of colors. Some embodiments may divide the wheel into three or four partitions, while other embodiments may have many more, based on the specific algorithm in use. Each segment may be defined as starting and ending at a particular degree line around the circumference of a color wheel, for example.

The illustrated example shows the 8-way segmentation example 302. These partitions are defined in the same manner as the color families, with partition 1 304 encompassing the 45 degree slice around the 0 degree point, partition 2 306 encompassing the family centered around 45 degrees, partition 3 308 centered on 90 degrees, partition 4 310 on 135 degrees, partition 5 312 on 180 degrees, partition 6 314 on 225 degrees, partition 7 316 on 270 degrees, and partition 8 318 on 315 degrees. On a typical HSL color map six partitions might be defined around 0 degrees (the red hues), 60 degrees (yellows), 120 degrees (greens), 180 degrees (cyans), 240 degrees (blues), and 300 degrees (magentas). Any number of partitions may be used to divide the color map.

By dividing the color map 202 into eight partitions as shown, a sample set of dominant color points 204 may be distributed as follows. Partition 1 304 may contain 4 data points, indicating that 4 photos in the user-defined set have a dominant color that falls within this range. Partition 2 306 may contain no data points. Partition 3 308 may have 1, partition 4 310 may have 0, partition 5 312 may have 4, partition 6 314 may have 0, partition 7 316 may have 6, and partition 8 318 may have three.

The color map 202 may also be divided using a more flexible scheme, rather than centering around 0 degrees and other geometrically conventional intervals. For example, if a particularly numerous cluster of dominant color points 204 is clustered around an along an axis that might typically be a partition boundary, such as 248 degrees in the FIG. 3 example, the boundaries might be offset such that this largest group of dominant color points 204 falls cleanly into a single partition. Alternately, should a group of dominant color points 204 in one partition be tied with another, while an offset in boundaries would yield a clearer dominant partition, the partition boundaries might be offset to break the tie. While the method disclosed herein may achieve successful results with a simplistic divisions oriented around 0 degrees, some embodiments may implement a more sophisticated partitioning approach, as needed.

Other approaches may also be implemented to settle ties between partitions in alternate embodiments. The partition centered around the lowest degree value might be given preference. For example, setting partition 7 316 aside, should the tie between partition 1 304 and partition 5 312 need to be broken, partition 1 304 may automatically be selected. Alternately, the partition with the greatest number of dominant color points 204 in adjacent partitions might receive preference. For example, the three data points in partition 8 318 may lead partition 1 304 to take precedence over partition 5 312, as there are no data points in either partition 4 310 or partition 6 314.

Figure 4:
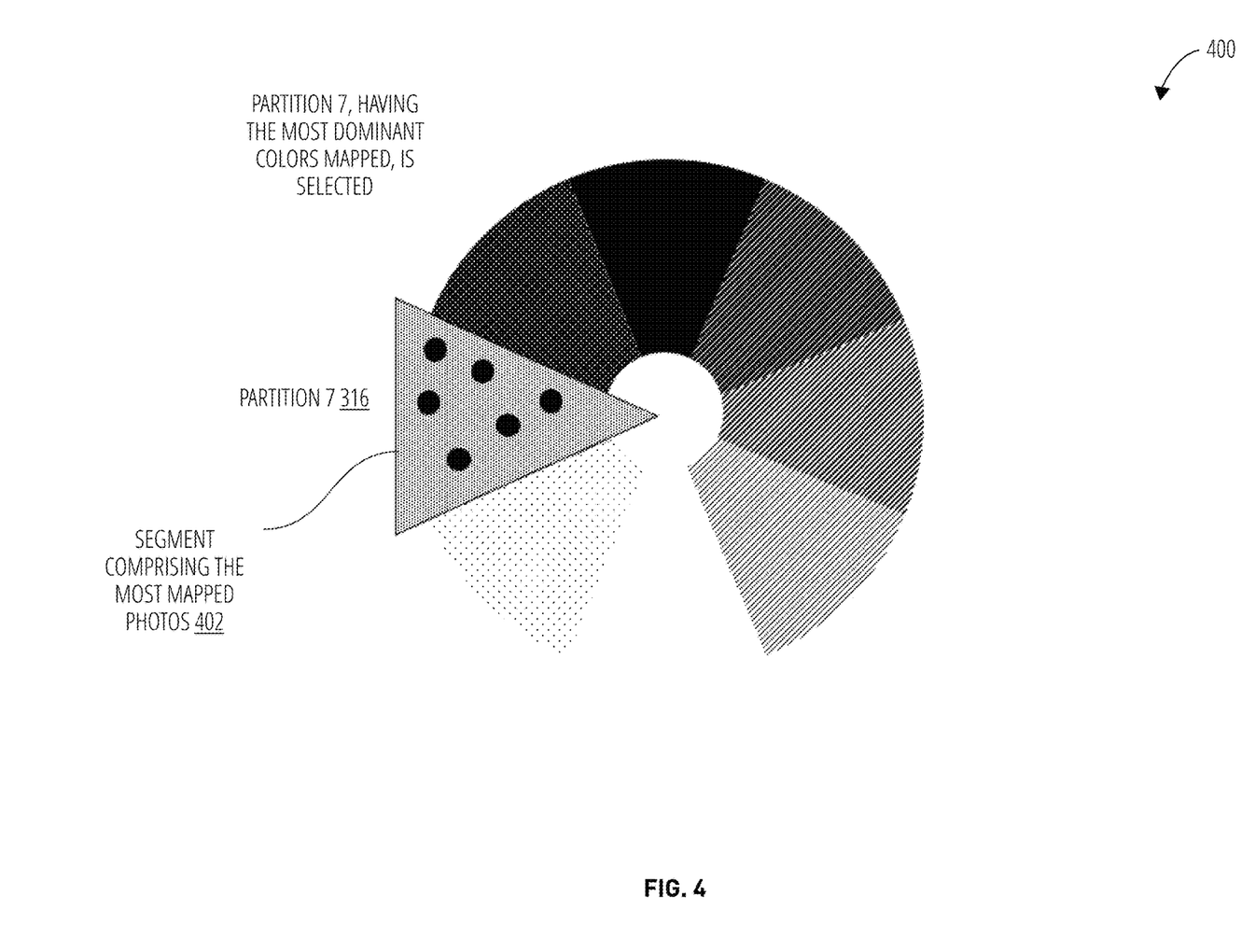
FIG. 4 illustrates color map partition selection 400 in accordance with one embodiment.

FIG. 4 illustrates color map partition selection 400 according to one embodiment. Using the segmentation illustrated in FIG. 3, as previously described, partition 7 316 encompasses six dominant color points 204. In other words, six photos have a dominant color within this range on the color map. Other partitions encompass 4, 3, 1, and 0 data points. Thus partition 7 316 is the dominant partition 402. The dominant color points 204 in partition 7 316 are selected for the next step in the process, described in FIG. 7.

The aforementioned approach in FIG. 3 may carry out the partitioning of a color space into equal sized regions without consideration to the clustering of the dominant color points in the color space. While advantageous in terms of simplicity and performance, other partitioning approaches that do take into consideration the clustering may also be utilized.

Figure 5:
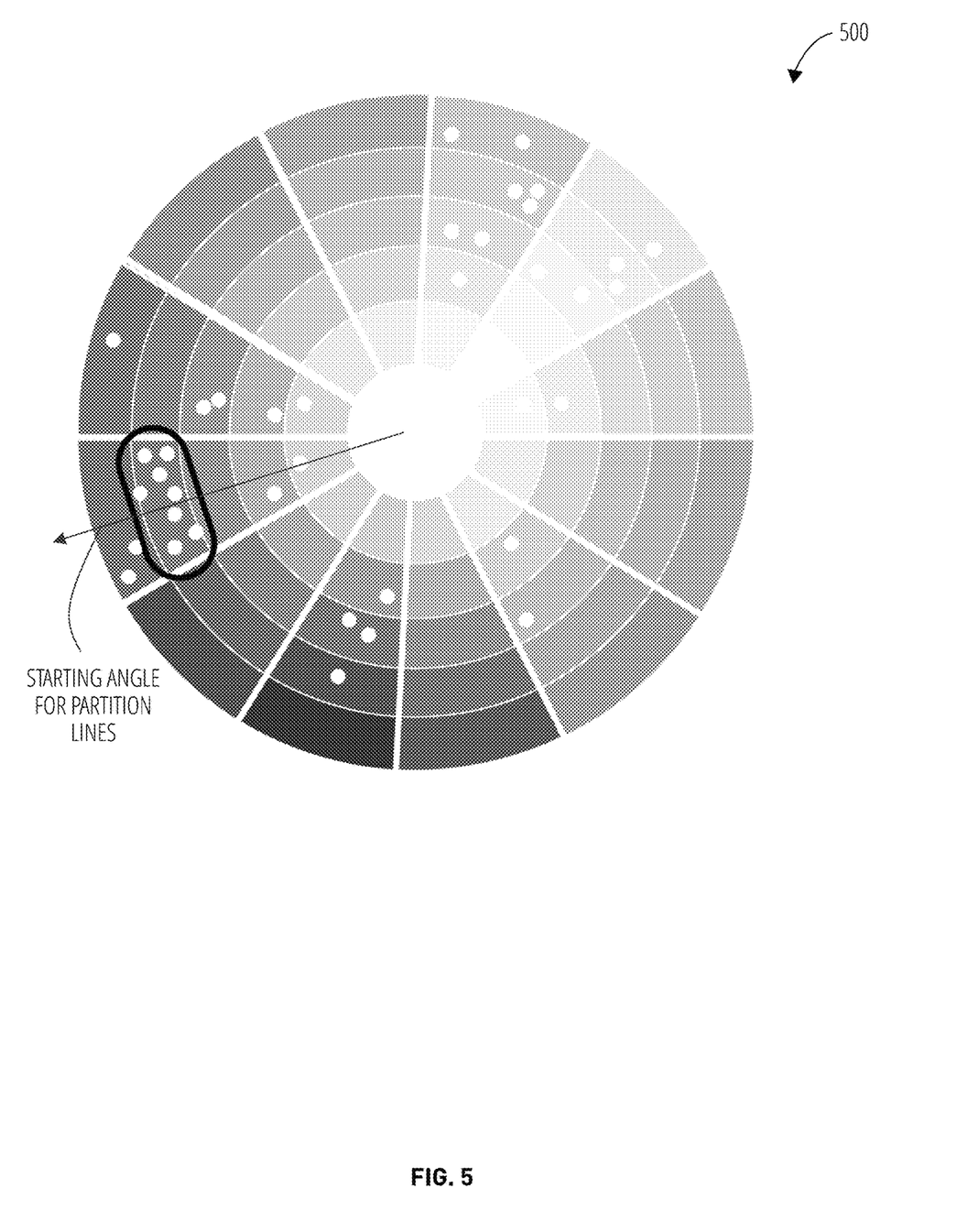
FIG. 5 illustrates a color map partition selection 500 in accordance with one embodiment.

For example in one approach, as depicted in FIG. 5, polar clustering is applied to the dominant colors of the images. In the color map partition selection 500 of FIG. 5, the polar axis (e.g., radians) is the hue of the color and the distance from the origin is the luminance. The color space is then partitioned equally into a preset number of regions with the partition lines based, for example, from a starting angle at a centerline through the largest cluster (shown in the black surrounding border).

Dominant color clustering may be carried out using any of a number of known approaches. For example, the dominant color coordinates may be projected from polar coordinates to Cartesian coordinates, and an algorithm such as K-means, hierarchical clustering, or "Density-Based Spatial Clustering of Applications with Noise" (DBSCAN), or spectral clustering, for example, applied to form the clusters.

Figure 6:
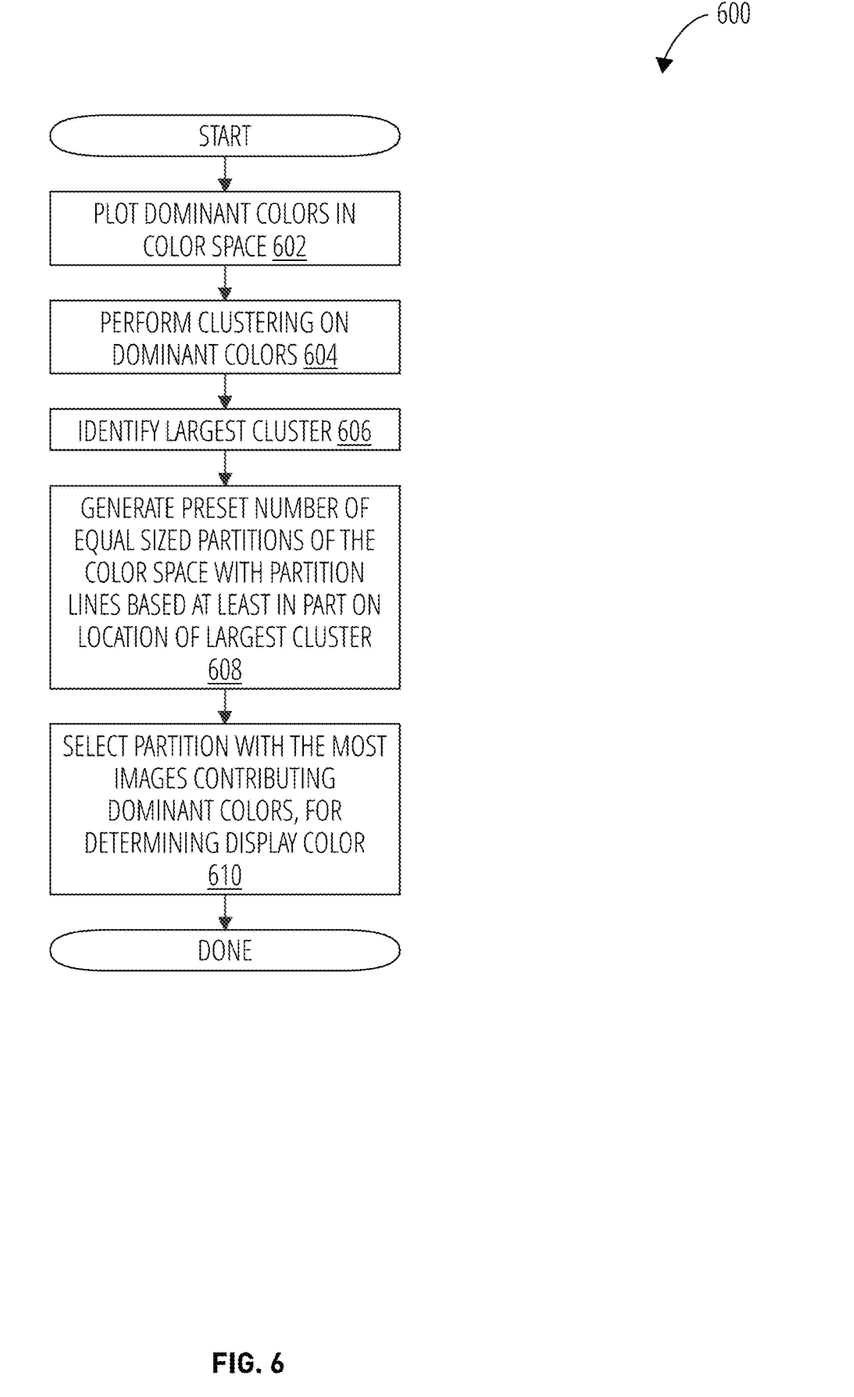
FIG. 6 illustrates a cluster-based partitioning process 600 in accordance with one embodiment.

FIG. 6 depicts a cluster-based partitioning process 600 in one embodiment. As with partitioning approaches that don't take into account the dominant color clustering, the dominant colors are first plotted in color space (block 602). Clustering is then carried out on the dominant colors (block 604) and the largest of the clusters is identified (block 606). A present number of equal sized partitions are then formed in the color space at block 608, the partition lines being based at least in part on the location of the largest cluster (e.g., it's centerline). As with partitioning approaches that don't take into account the dominant color clustering, the partition with the most images contributing dominant colors may be selected for determining the display color of the user interface element (block 610). In this context, "display color" refers to refers to a color as it would be perceived, based on a normalized human perceptive capability, on a machine display, such as an LED display screen.

More generally, a partition meeting some threshold value of dominant color inclusion may be selected. This need not necessarily be the partition with the highest number of images contributing dominant colors (e.g., it could be second highest if that met the inclusion criterion).

Figure 7:
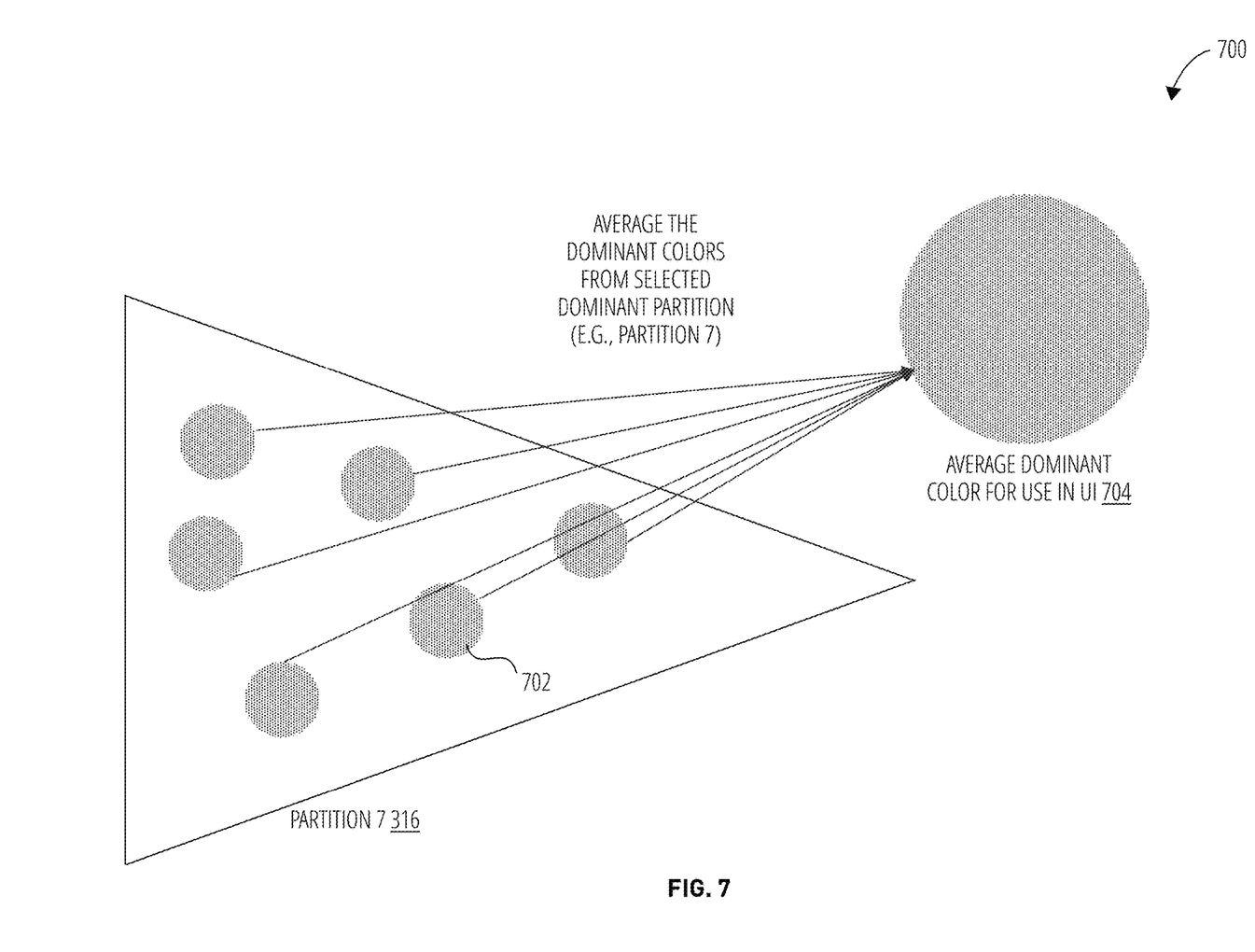
FIG. 7 illustrates average dominant color generation 700 in accordance with one embodiment.

FIG. 7 illustrates average dominant color generation 700 according to one embodiment. The dominant colors from sample image set 702 residing in partition 7 316 may be averaged using a conventional method of statistical analysis. For example, the degree values and distances from the center of the color map may be added together, respectively, and divided by six (or whatever dominant color count the partition has) to yield an average degree and an average distance. The color value at that point on the map becomes the average dominant color 704.

In a real-world implementation, this average dominant color 704 may not be visually pleasing for use as a user interface element background. Having many of the photos with dominant colors very close to but not matching the background may not be appealing. However, the average dominant color 704 may be used as a base value in calculating complimentary and contrasting colors that will visually harmonize with the majority of photographs in the set.

In a typical embodiment, a color value directly across the color map (e.g., at or around 180 degrees away on a color wheel) may be chosen to contrast effectively with the average dominant color. A user interface element color palette may then utilize this high contrast color/complement color as a background, perhaps using the dominant color for text on the background color. In this context, "high contrast color" refers to a color providing sharp contrast in relation to surrounding colors, as perceived on a normalized human perception scale. Algorithms that ensure color palettes meet accessibility standards are conventionally used by graphic designers. Such algorithms may be implemented to ensure that a palette based on and containing the average dominant color 704 meets accessibility as well as aesthetic standards.

Figure 8:
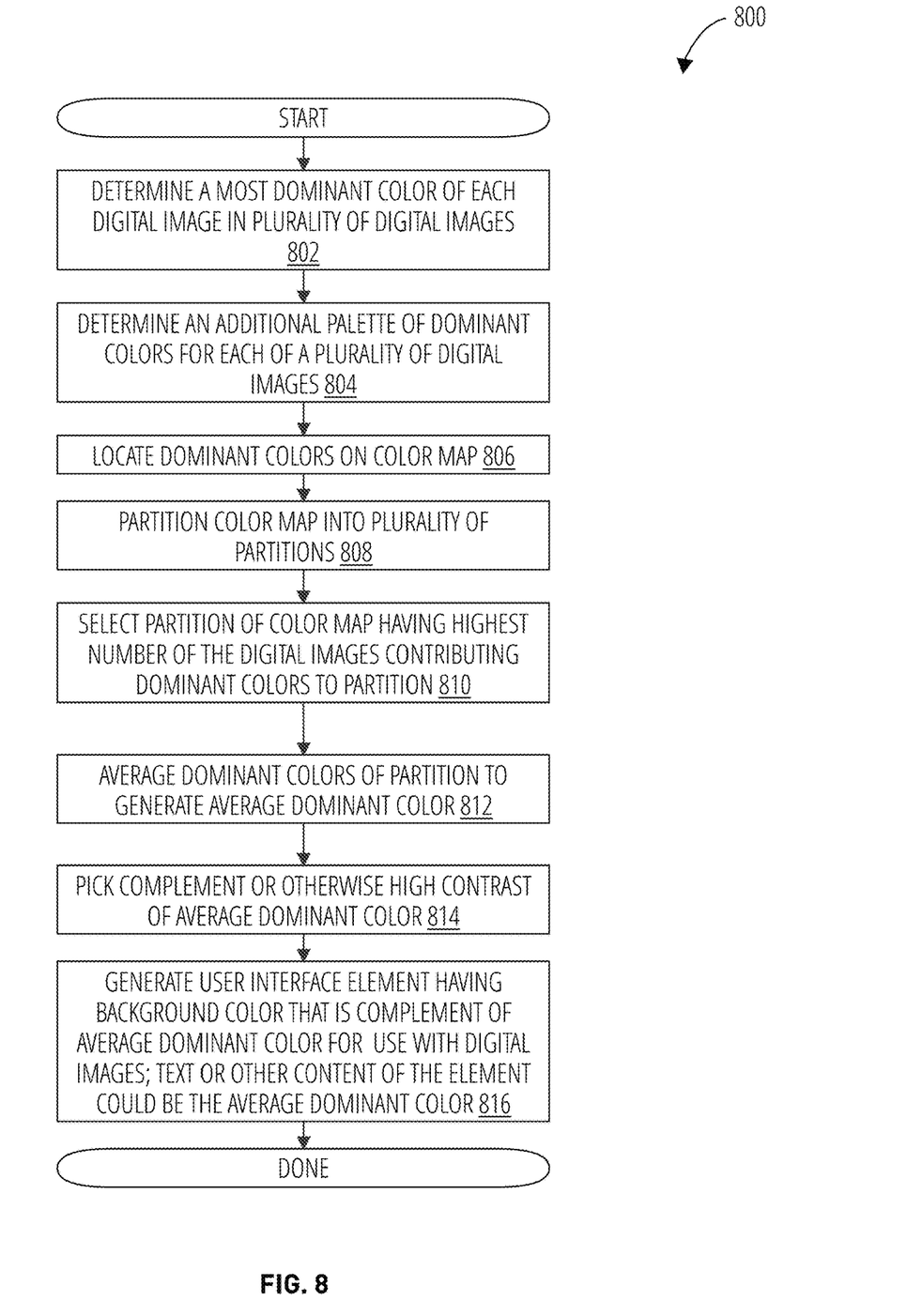
FIG. 8 illustrates a user interface element color generation routine 800 in accordance with one embodiment.

FIG. 8 illustrates a user interface element color generation routine 800 in accordance with one embodiment. In block 802, user interface element color generation routine 800 may determine a most dominant color of each digital image in a plurality of digital images, as shown in FIG. 1. In block 804, user interface element color generation routine 800 determines additional dominant colors for each of the plurality of digital images, as shown in FIG. 1. In block 806, user interface element color generation routine 800 locates the dominant colors on a color map, as shown in FIG. 2.

In block 808, user interface element color generation routine 800 partitions the color map into a plurality of regions, as shown in FIG. 3. In block 810, user interface element color generation routine 800 selects a partition of the color map having a highest number of the digital images contributing the dominant colors to the partition, as shown in FIG. 4. In block 812, user interface element color generation routine 800 averages the dominant colors of the partition to generate an average dominant color as shown in FIG. 7. In block 814, user interface element color generation routine 800 selects a compliment or otherwise high contrast color based on the average dominant color. In addition to complementary colors, examples of otherwise high contrast colors are split complementary colors, or colors having a distance within a preset threshold value from complementary or split complementary colors, as determined by conventional polar or Cartesian distance calculations. In block 816, user interface element color generation routine 800 generates a user interface element based on the average dominant color for use with the digital images.

Figure 9:
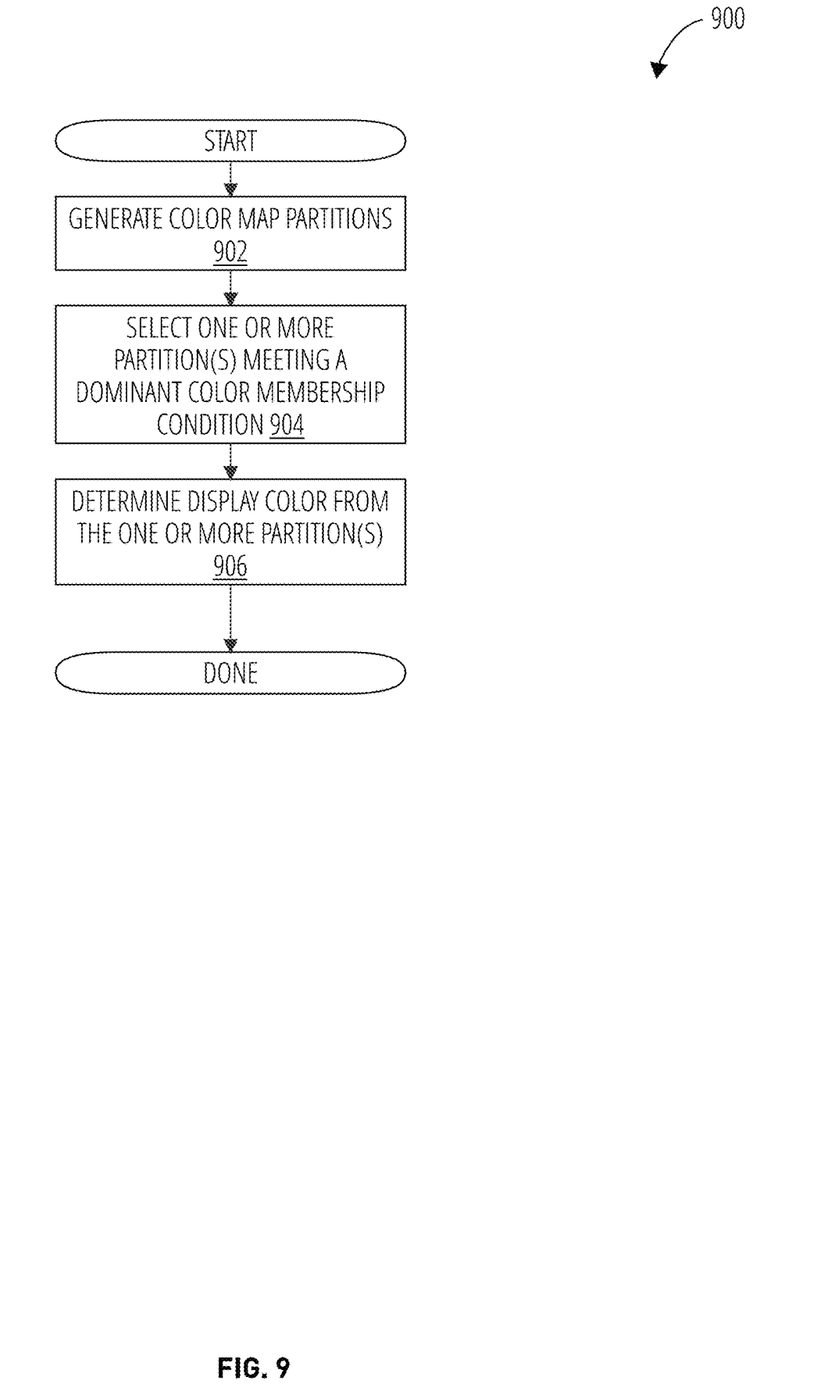
FIG. 9 illustrates an average dominant color generation 900 in accordance with one embodiment.

FIG. 9 depicts average dominant color generation 900 more generally. The aforementioned color map partitions are generated in one of the described ways (block 902). One or more partitions are then selected that meet a condition for dominant color membership (block 904). For example, one or both of the partitions having the highest number of images contributing dominant colors in relation to their peers may be selected, or all partitions having more than a threshold number of images contributing dominant colors might be selected, and so on. The display color is then determined from dominant colors in the selected partition(s) (block 906).

Figure 10:
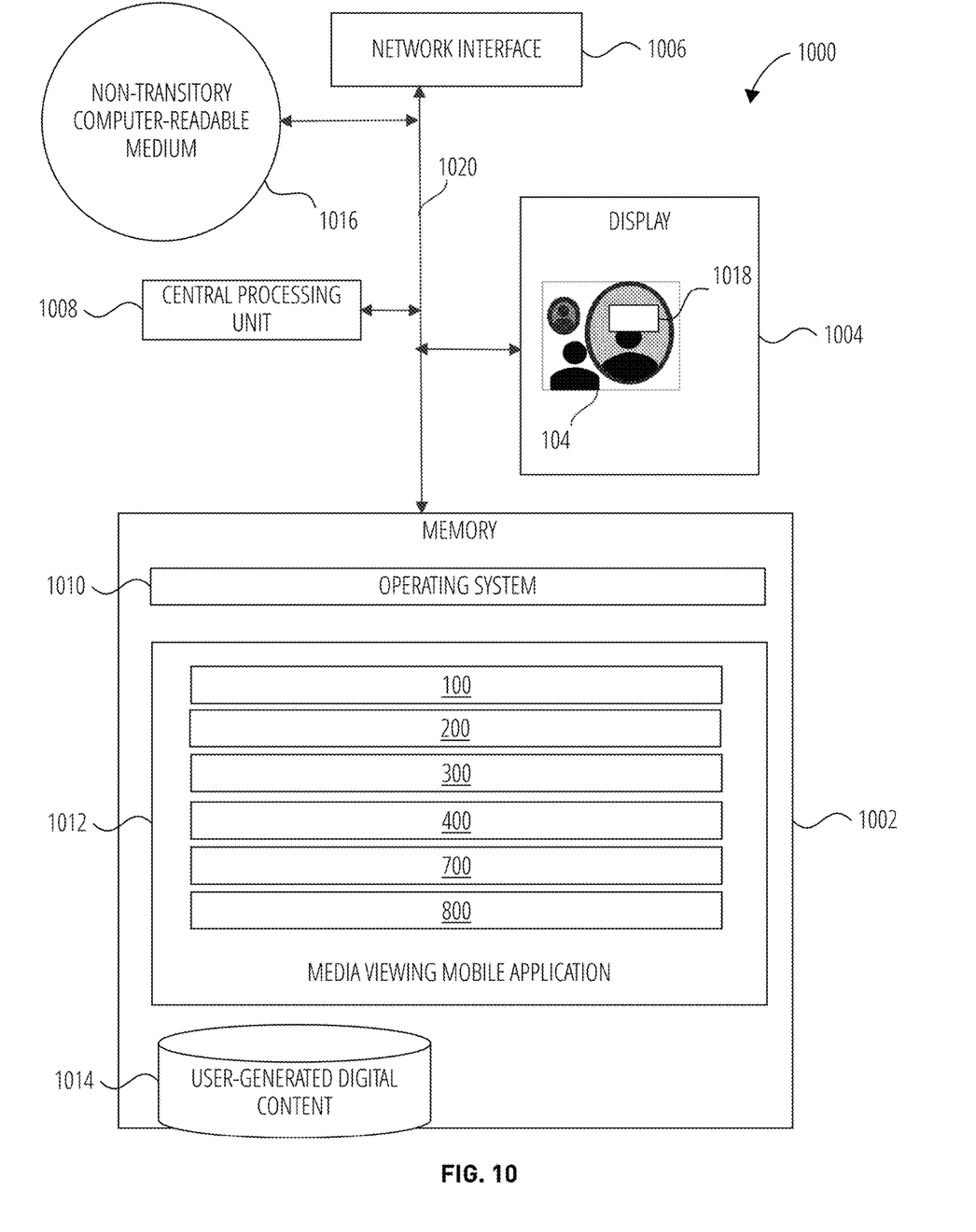
FIG. 10 illustrates a data processing system 1000 in accordance with one embodiment.

FIG. 10 illustrates several components of an exemplary data processing system 1000 in accordance with one embodiment. In various embodiments, data processing system 1000 may include a mobile phone, laptop, tablet, or other computing device that is capable of performing operations such as those described herein. In some embodiments, data processing system 1000 may include many more components than those shown in FIG. 10. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, data processing system 1000 may comprise one or more physical and/or logical devices that collectively provide the functionalities described herein. In some embodiments, data processing system 1000 may comprise one or more replicated and/or distributed physical or logical devices.

In some embodiments, data processing system 1000 may comprise one or more computing resources provisioned from a "cloud computing" provider, for example, Amazon Elastic Compute Cloud ("Amazon EC2"), provided by Amazon.com, Inc. of Seattle, Wash.; Utilities Cloud, provided by Oracle Corp., Inc. of Redwood, Calif.; Windows Azure, provided by Microsoft Corporation of Redmond, Wash., and the like.

Data processing system 1000 includes a bus 1020 interconnecting several components including a network interface 1006, a display 1004, a central processing unit 1008, and a memory 1002. The data processing system 1000 may be used to execute image management applications to set one or more color for a user interface element 1018 overlaid on user-generated content such as digital image 104. The user interface element 1018 appears as a foreground element relative to the background generated by the digital image 104. The user interface element 1018, in turn, has a background color that is in high contrast ("stands out") relative to the dominant color(s) of the digital image 104.

Memory 1002 generally comprises a random access memory ("RAM") and permanent non-transitory mass storage, such as solid-state memory components. Memory 1002 stores an operating system 1010.

These and other software components may be loaded into memory 1002 of data processing system 1000 using a drive mechanism (not shown) associated with a non-transitory computer-readable medium 1016, such as a DVD/CD-ROM drive, memory card, network download, or the like. These drive mechanisms thus comprise means for configuring the memory 1002 with instructions to carry out processes disclosed herein.

Memory 1002 also includes user-generated digital content 1014, such as photographic image files and video files. In some embodiments, data processing system 1000 may communicate with user-generated digital content 1014 via network interface 1006, a storage area network ("SAN"), a high-speed serial bus, and/or via the other suitable communication technology.

In some embodiments, user-generated digital content 1014 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Memory 1002 also includes the logical mechanisms that enable the method disclosed herein. A media viewing mobile application 1012 may be installed to the non-transitory computer-readable medium 1016, typically from an online application shop available through the network interface 1006, such as the Apple store. The media viewing mobile application 1012 may comprise logic that performs the dominant color extraction 100 disclosed herein and described in detail above. The media viewing mobile application 1012 may further comprise the logic described in conjunction with FIG. 2 through FIG. 8. This logic thus comprises the means to configure the central processing unit 1008, graphics processing unit, or other data processing means to carry out the processes disclosed herein.

A data processing means may include the central processing unit 1008. A storage means including means for configuring the data processing means may include memory 1002, a computer-readable storage medium storing user-generated digital content 1014, a non-transitory computer-readable medium 1016, or the like. The storage means may include its one data processor (e.g., CPU, GPU, SoC, ASIC, etc.), data processing means, or the storage means may use the central processing unit 1008. Means for configuring the data processing means may include one or more logic components configured based on computer instructions, the logic components comprising dominant color extraction 100 module, dominant color mapping on a color map 200 module, color map partitioning 300 module, color map partition selection 400 module, color map partition selection 500 module, cluster-based partitioning process 600 module, average dominant color generation 700 module, user interface element color generation routine 800 module, and/or media viewing mobile application 1012, or the like.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method performed by a data processor for generating a display color on a user interface, the method comprising:
   determining, by the data processor, a set of dominant colors for a plurality of digital images from a set of digital content;
   determining, by the data processor, a display color from the set of dominant colors,
   wherein the display color is a high contrast color of an average of the set of dominant colors, the high contrast color comprising a complement of the average of the set of dominant colors; and
   displaying, by the data processor, a user interface element, having the display color, over digital content.

2. The method of claim 1, wherein determining the set of dominant colors comprises selecting a partition from a plurality of partitions of a color map, the partition satisfying a condition for a number of digital images with dominant colors in the partition.

3. The method of claim 2, wherein the condition is that the partition comprises dominant colors from a highest number of the digital images.

4. The method of claim 2, wherein selecting the partition comprises:
   determining the dominant colors for each of the digital images;
   locating the dominant colors on the color map;
   segmenting the color map into the plurality of partitions; and
   identifying the partition from among the plurality of partitions as a partition having a highest number of digital images contributing the dominant colors.

5. The method of claim 1, wherein the display color is a background color of the user interface element.

6. The method of claim 1, further comprising using the average of the set of dominant colors as a color for text of the user interface element.

7. The method of claim 1, wherein:
   the digital images used to determine the display color are a subset of a set of digital content; and
   the subset comprises a set of stored digital images currently displayed in the user interface.

8. A non-transitory computer-readable storage medium including instructions that, when executed by a processor of a digital device, cause the digital device to:
   display a plurality of digital images on a display; and
   generate a foreground user interface element configured for display on a background of one or more of the digital images, the foreground user interface element having a display color selected by:
      selecting a partition from a plurality of partitions of a color map, the partition selected for having a highest number of the digital images with dominant colors in the partition; and
      selecting a contrasting color of an average of the dominant colors as the display color.

9. The non-transitory computer-readable storage medium of claim 8, wherein the contrasting color comprises a complement of the average of the dominant colors in the partition.

10. The non-transitory computer-readable storage medium of claim 8, wherein the display color is a background color of the foreground user interface element.

11. The non-transitory computer-readable storage medium of claim 8, wherein the instructions further cause the digital device to use the average of the dominant colors as a color for text of the foreground user interface element.

12. The non-transitory computer-readable storage medium of claim 8, wherein selecting the partition comprises:
   determining the dominant colors for each of the digital images;
   locating the dominant colors on the color map;
   segmenting the color map into the plurality of partitions; and identifying the partition from among the plurality of partitions as a partition having the highest number of the digital images contributing the dominant colors.

13. The non-transitory computer-readable storage medium of claim 8, wherein:

the digital images used to determine the display color are a subset of a larger collection of stored digital images; and the subset is a set of digital images currently being displayed in a user interface.

14. A computing apparatus comprising:

data processing means; and storage means including means for configuring the data processing means to:

plot dominant colors of a plurality of digital images on a color map;

cluster the dominant colors;

partition the color map into equal sized regions based at least in part on a position of a largest cluster of the dominant colors; and use a display color derived from the dominant colors of a particular one of the equal sized regions for a user interface element that overlays one or more of the digital images.

15. The computing apparatus of claim 14, wherein the particular one of the equal sized regions comprises a region having dominant colors contributed from a highest number of the digital images.

16. The computing apparatus of claim 14, the display color comprising a complement of an average of the dominant colors in a region of the color map, the region selected for having a highest number of the dominant colors from among the equal sized regions.

17. The computing apparatus of claim 14, wherein the color map is partitioned into eight equal sized regions.

18. The computing apparatus of claim 14, wherein the display color is a background color of the user interface element.

19. The computing apparatus of claim 14, further comprising means for configuring the data processing means to use an average of the dominant colors as a color for text of the user interface element.

\* \* \* \* \*